United States Patent [19]

Sakaki et al.

[11] Patent Number: 4,781,110

[45] Date of Patent: Nov. 1, 1988

[54] BAND GUIDING ARCH FOR STRAPPING MACHINE

[75] Inventors: Yasunori Sakaki, Tokyo; Kenji Fujii, Yamato; Seiichiro Koyama; Yosikatsu Aizawa, both of Tokyo; Tsutomu Tagomori, Yokohama, all of Japan

[73] Assignee: Strapack Corporation, Tokyo, Japan

[21] Appl. No.: 27,217

[22] Filed: Mar. 10, 1987

[30] Foreign Application Priority Data

Mar. 13, 1986 [JP] Japan .............................. 61-35350[U]
May 20, 1986 [JP] Japan ................................ 61-113755

[51] Int. Cl.⁴ ............................................ B65B 13/06
[52] U.S. Cl. .................................. 100/26; 100/33 PB; 53/589
[58] Field of Search ....................... 100/25, 26, 33 PB; 53/589

[56] References Cited

U.S. PATENT DOCUMENTS 4,011,808  3/1977  Aoki et al.
4,520,720  6/1985  Urban et al. ............................ 100/26
4,625,635  12/1986  Lewis ..................................... 100/26
4,697,510  10/1987  Cranston, III et al. ........... 100/26 X Primary Examiner—Andrew M. Falik
Attorney, Agent, or Firm—Burns, Doane, Swecker & Mathis

[57] ABSTRACT

An arch guide for a strapping machine comprises corner sections interconnected by linear sections. Each of those sections includes inner and outer peripheral portions disposed, respectively, closer to and farther from a center of the guide. The inner and outer portions form a guide passage for the band, the passage being open at a side facing a guide plate. The open side of the arch guide is yieldably urged against the guide plate to close the open side. The inner portion extends toward the guide plate at an inwardly directed inclination to facilitate movement of the arch guide away from the guide plate when the band is being withdrawn from the passage. A guide extends from the leading end of a linear section into a trailing end of a corner section for directing an advancing band toward the outer portion of the corner section. The outer portion of at least the linear sections are yieldable in a direction away from the inner portion in a manner increasing the height of the height of the open side of the band passage. The guide plate carries an elastic material covered by a sheet of anti-wear, anti-friction material against which the open side of the arch guide is biased.

8 Claims, 12 Drawing Sheets

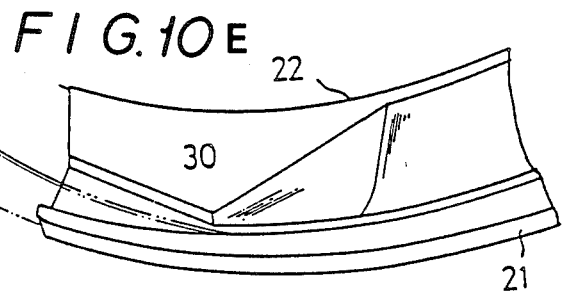
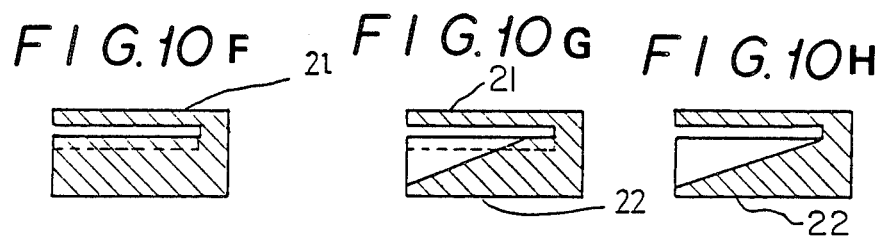
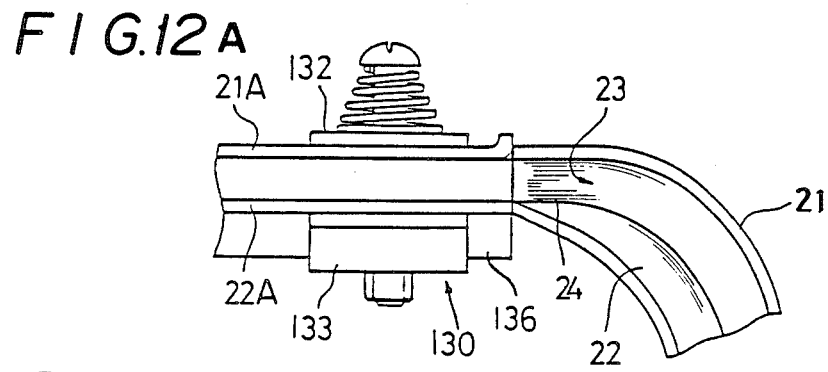
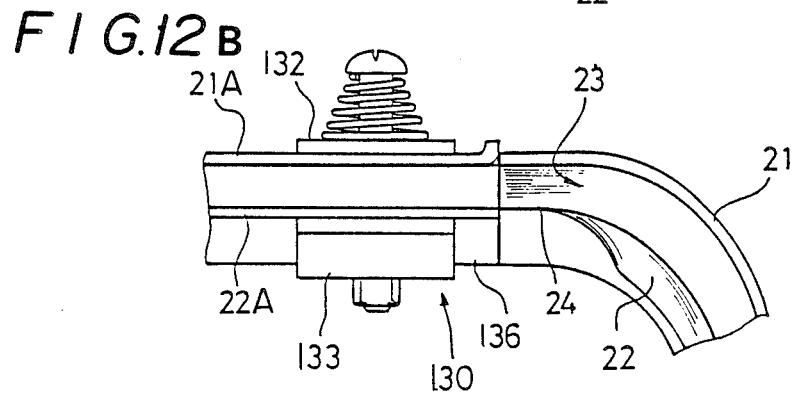

BAND GUIDING ARCH FOR STRAPPING MACHINE

FIELD OF THE INVENTION AND RELATED ART

This invention relates to a band guiding arch provided on a strapping machine body.

A conventional automatic strapping machine having a band guiding arch is constructed to feed a strapping band into the band guiding arch by a band supply mechanism located in the strapping machine body. The band is thus positioned in a loop-shape around an article to be strapped. A leading end of the band is held by a band end holding mechanism in the known body as shown in FIG. 2, whereupon the band is reversed by a band returning and tightening mechanism. This causes the band to be withdrawn through a flap in the band guiding arch and become tightened around the article. The superposed portions of the leading end and the supplying end of the band are then fusion-bonded by a band fusion-bonding mechanism. Then, the article-binding portion of the band is separated from the rest of the band by a cutting procedure.

The flap of the band guiding arch may comprise an inherently elastic material or may be spring-biased closed. An arch frame may be integral with the band way or mounted to the band way, and an arch cover may enclose these members. Since the flaps are spaced at a long distance from the peripheral surface of the article to be strapped, the band may meander after passing through the flaps and become strapped obliquely to the article. Thus, the band may become loosened when the strapped article is transported, and may become separated from the article. A band having a slender width of 5 to 6 mm frequently used recently for economic reasons is particulary prone to move in a meandering manner when the band is withdrawn. Also, a foamable styrol frequently used as a strapping material exhibits a high degree of friction which causes the band to malfunction during travel in the machine body.

To overcome the above problems, a band strapping apparatus has been developed, as disclosed in U.S. Pat. No. 4,011,808 illustrated in FIGS. 18 to 20. In that apparatus, an arch guide 1 made of a flexible resin U-shaped in section has its open side pressed against the inner wall of an arch cover 2 by springs 3 to form a band passage 4. When the band B is reversed in direction, it acts to move the arch guide sequentially away from the arch cover 2 to allow the band to escape. However, the open side of the arch guide made of flexible resin is cut by the edges of the band of polypropylene or polyester when the band escapes.

Also, as shown in FIG. 19, when the band is withdrawn from a linear section of the arch guide, the band can become protruded or undulated in the arch guide 1 and thus resist exiting. A similar problem can occur at the corner sections of the arch guide. Usually, the tightening mechanism is actuated by a cam or a timer, which means that the restrained band might have its ends fused before the band is completely pulled out of the guide 1.

Furthermore, since a plastic band for a band strapping machine such as a polypropylene band constitutes a slender band of small thickness having no stiffness, it can meander while being fed through the arch guide passage and become twisted and jammed as shown in FIG. 20A.

However, to avoid such problems, when the band passage 4 of the arch guide 1 is formed with a height greater than the band width, the band B rises at release time as shown in FIG. 20B, and becomes stopped within the arch guide 1 in a twisted state. In this case, the band cannot be moved away or withdrawn. If the arch guide is formed with an even larger height, the band is erected when being fed, and eventually becomes inverted in the arch guide 1.

Moreover, when the arch guide is widened in width to absorb the meandering movement of the band, the removal of the band becomes further difficult.

OBJECT AND SUMMARY OF THE INVENTION

An object of the present invention is to provide an improved band guiding arch for a strapping machine which eliminates the drawbacks of the prior art and which absorbs the meandering movement of a band itself to enable the band to be withdrawn reliably and smoothly from an arch guide and to be reliably fed through the arch guide.

To accomplish the above object, according to the present invention, there is provided a band guide arch in which a band-receiving passage is defined by inner and outer peripheral portions. The passage is open to one side which faces a guide plate to close the passage. The inner peripheral portion of the corner sections of the arch guide includes a band-engaging surface which is inclined inwardly toward the guide plate to facilitate withdrawal of the band from the passage. Preferably, in linear sections of the arch guide, which interconnect the corner sections, the outer peripheral portion can move away from the inner peripheral portion to increase the size of the opening to facilitate withdrawal of the band.

BRIEF DESCRIPTION OF THE DRAWINGS

The objects and advantages of the invention will become apparent from the following detailed description of preferred embodiments thereof in connection with the accompanying drawings, in which like numerals designate like elements, and in which:

FIGS. 12A and 12B are enlarged views showing a junction of a corner section and linear section;

FIGS. 18 to 20 show a prior art arrangement, wherein FIG. 18 is a sectional view, FIGS. 19 and 20A are perspective views and FIG. 20B is a sectional view illustrating problems associated with the prior art.

DETAILED DESCRIPTION OF THE PREFERRED EMBODIMENTS

Embodiments of the present invention will now be described with reference to the drawings.

In FIGS. 1 to 6, an arch cover 11 which forms a band guiding arch 10 is arranged on a working table of a strapping machine body. The machine includes a band reel on which a strapping band is wound, and various known mechanisms S, such as band supplying and tightening mechanisms, and a fusion-bonding mechanism. An arch guide 20 is provided in the arch cover 11. The arch guide 20 comprises corner sections W to Z interconnected by linear sections. For supplying the band, an end of one linear section EN forms a band inlet disposed oppositely to a band fusion-bonding mechanism S. An opposing end of another linear portion EX forms a band outlet positioned oppositely to a band lead end holding mechanism G of the band fusion-bonding mechanism S.

Figure 1:
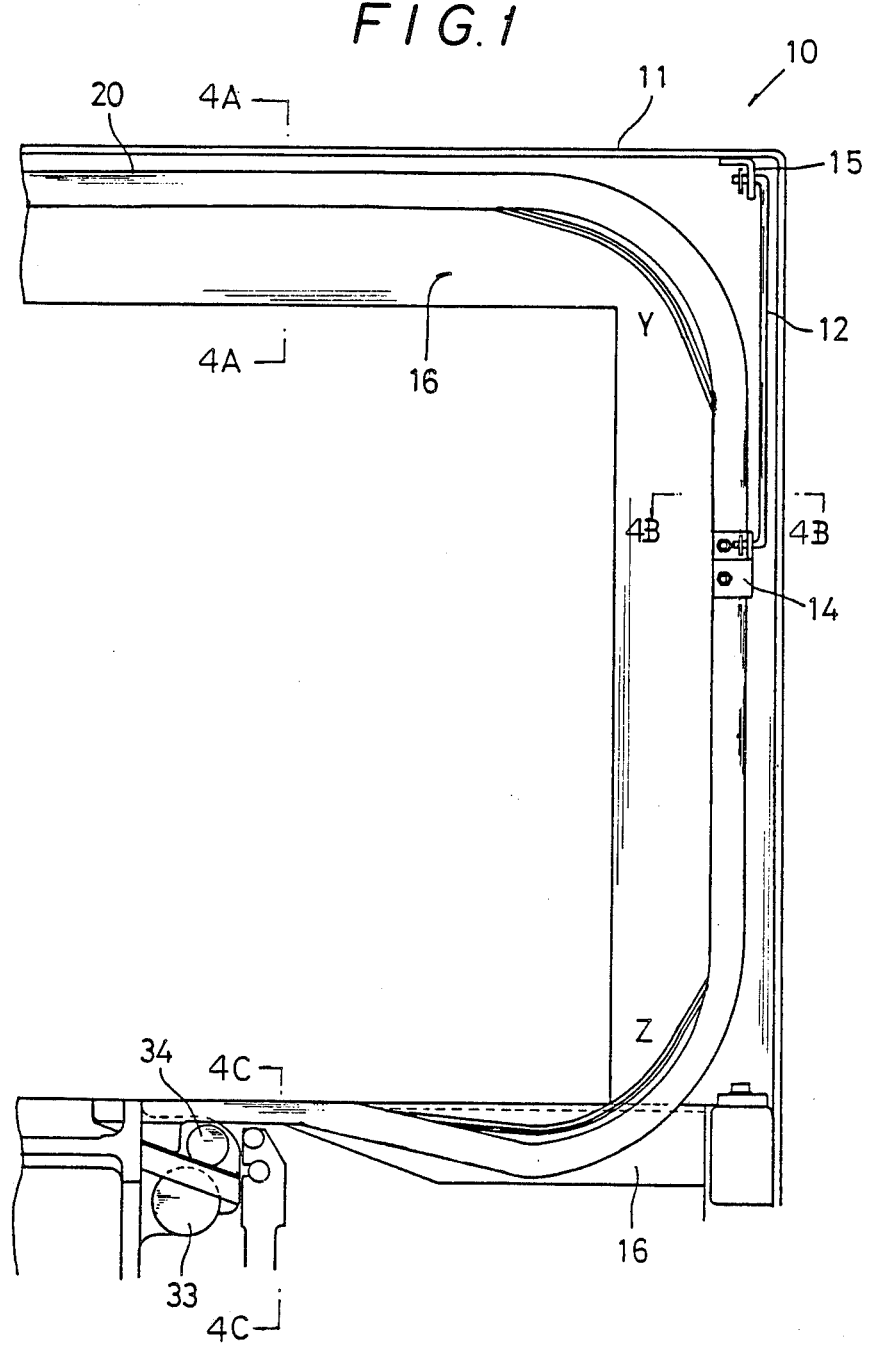
FIG. 1 is a side elevational schematic view of a right-hand portion of an embodiment of a band guiding arch for a strapping machine according to the present invention.
Figure 2:
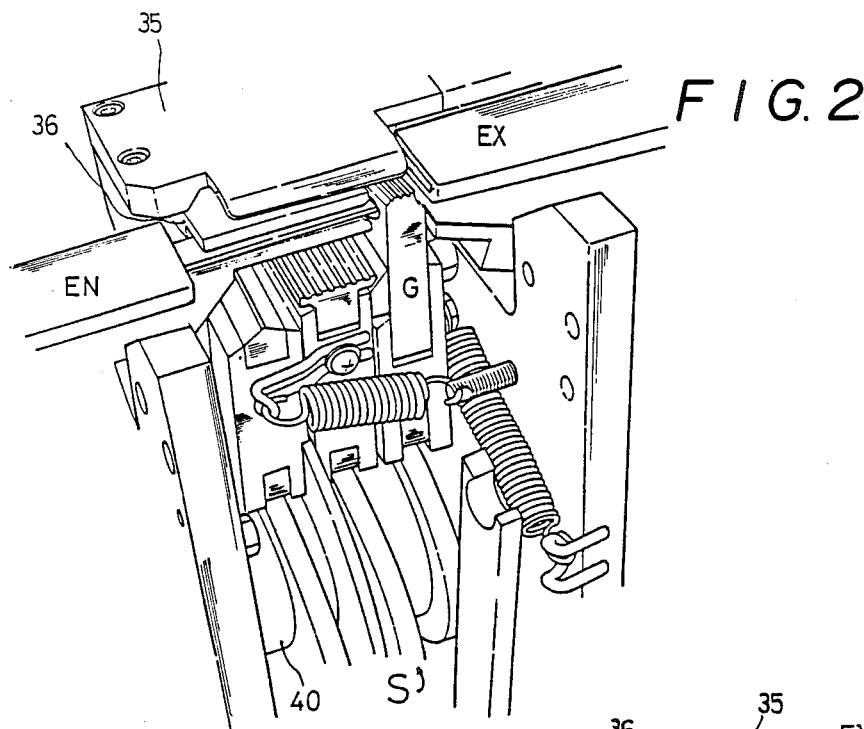
FIG. 2 is a perspective view of the arch in the vicinity of a band fusion-bonding mechanism.
Figure 3:
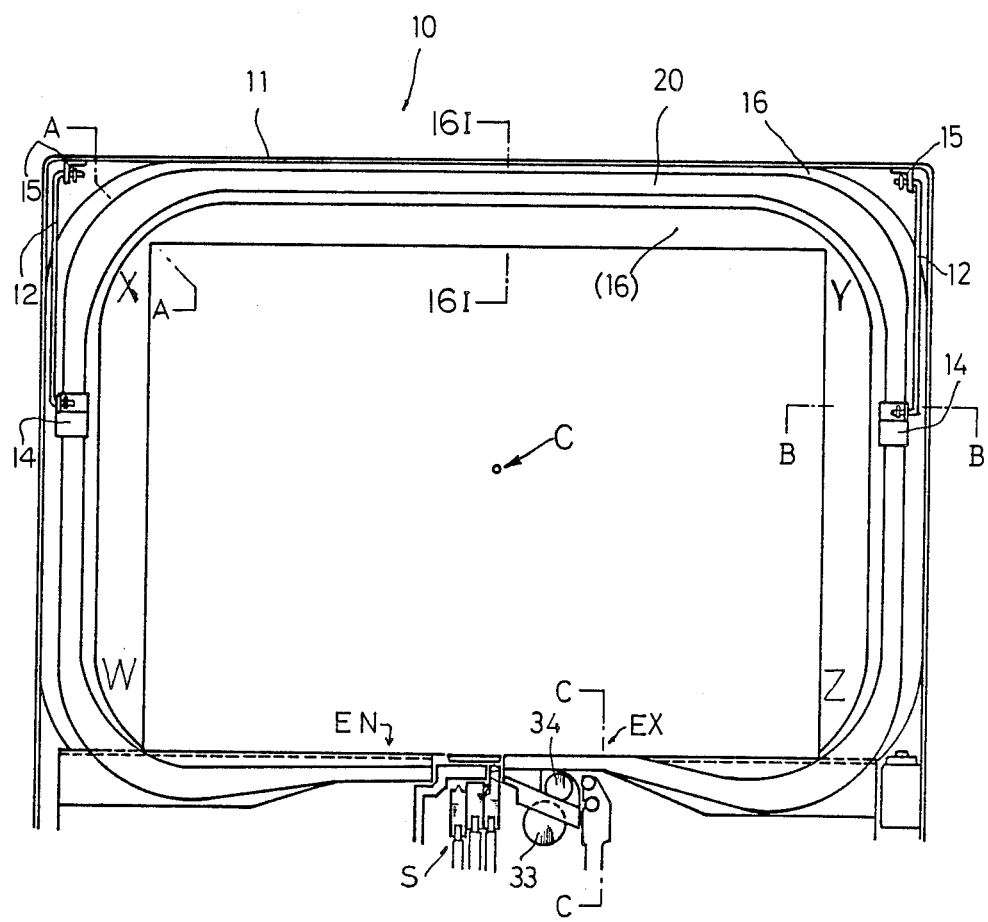
FIG. 3 is a side elevational schematic view of the entire band guiding arch.
Figure 4A:
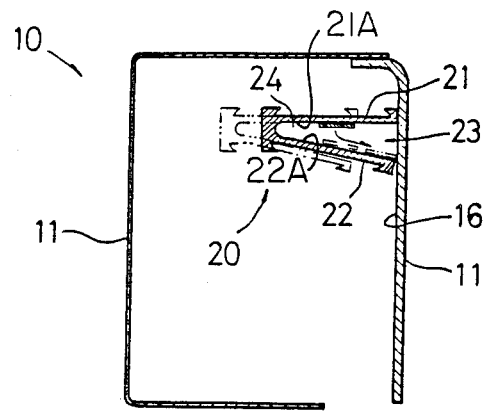
FIGS. 4A, 4B and 4C are sectional views taken along the lines 4A—4A, 4B—4B and 4C—4C of FIG. 1, respectively.

The arch guide 20 may comprise any suitable material such as synthetic resin having no flexibility or metal such as aluminum. The arch guide can be cut to shape or integrally molded by drawing the inner surface thereof to form smooth linear surfaces in such a manner that the corner sections W to Z and the linear sections are individually molded and coupled in series, whereby the size of the arch guide can be changed by selecting suitable lengths of the linear sections. As shown in FIGS. 1, 3 and 4, each of the corner sections of the arch guide 20 comprises a V-shaped member having integral inner and outer peripheral portions or pieces 22, 21 forming a band passage 24. An open side 23 of that member is closed by a guide plate 16. The inner peripheral piece 22 (and thus also the band-engaging surface 22A of that inner piece) is inclined inwardly, i.e., toward the center C of the arch as the piece 22 approaches the plate 16 to form an acute angle with the guide plate 16 (see FIG. 4A). More specifically, the inner peripheral piece 22 may be inclined, for example, at about 25° with respect to the guide plate. Instead of the entire inner piece 21 being so inclined, it is possible that only the band engaging surface 22A thereof would be inclined, whereby the inner piece would taper in thickness toward the guide plate.

The band passages 24 formed in the corner sections W to Z are coupled with the band passage of the linear sections at both longitudinal ends of the corners so that open sides 23 of the linear and corner sections are contiguous. The outer peripheral piece 21 extends substantially perpendicularly to the guide plate, whereby the inner band-facing surface of the outer piece 21 extends substantially perpendicularly to the guide plate 16. The inner peripheral pieces 22 whose inner surfaces are inclined inwardly toward the open sides 23 form a band passage 24 whose width is about 1.5 to 6 times as wide as the band width. (Normally used bands have a width of from 4.5 to 19 mm.) The inner width of the arch guide of the linear portion EX near the band fusion-bonding mechanism S is slightly smaller than the width of the linear portion EN.

Figure 5:
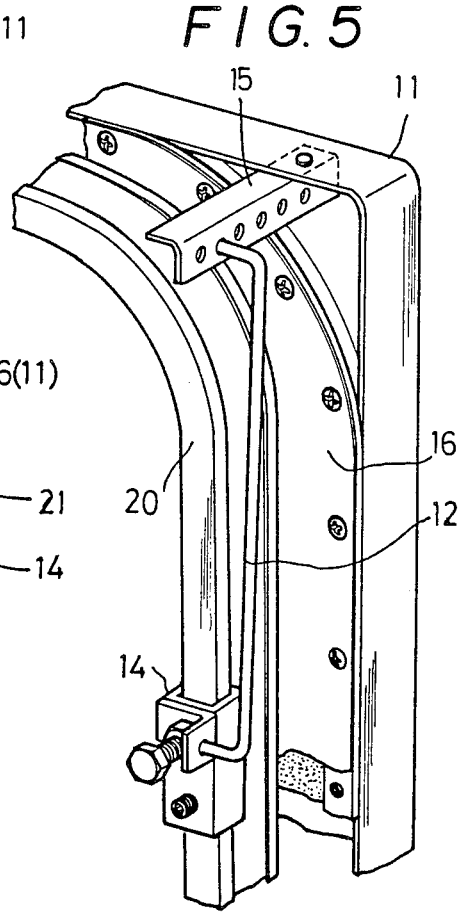
FIG. 5 is a fragmentary perspective view showing the mechanism for mounting the arch guide.

The arch guide 20 is hung by a pair of rods 12 in the arch cover 11, such that the open sides 23 normally bear against the guide plate 11 by the weight of the arch guide (i.e., by gravity). More particularly, as shown in FIGS. 3 and 5, bent portions of the lower ends of both rods 12 are rotatably mounted in holes of brackets 14 fastened to the back surfaces of the right and left side linear portions of the arch guide 20 above the upper corners X and Y of the arch guide 20. Also, bent portions of the upper ends of both rods 12 are rotatably mounted in holes of brackets 15 protruding from the inner wall of the arch cover 11 above corners X and Y. The mounting portions of the rods 12 on the arch guide 20 are spaced farther from the guide plate 16 more than are the mounting portions of the rods 12 on the brackets 15. Thus, the arch guide 20 is continuously urged by its own weight toward the guide plate 16, whereby the outer peripheral piece 21 contacts the guide plate 16, and the inner peripheral piece 22 is spaced by a small gap from the guide plate 16.

The rods 12, instead of being fastened to linear portions of the arch guide 20 may be fastened to the upper corners of the arch guide 20 as long as the arch guide 20 may be urged suitably toward the guide plate 16 by its own weight. The arch guide 20 may be constantly urged toward the guide plate 16 by springs if required.

A slide member 47 has a cam follower 42 rotating slidably against a cam 41 formed on the end of a cam shaft 40 for operating the fusion-bonding mechanism S. The latter has a band leading end holding mechanism G. The slide member is coupled at the upper end thereof through a bracket 43 with the inlet side linear section EN near the band fusionbonding mechanism S at the first corner W of the arch guide 20. The side member 47 serves to forceably open the arch guide for initially removing the band from the arch guide. A slide member may be so provided at the outlet side linear section EX to cooperate with the slide member 47 to forcibly open the inlet side linear section EN and/or the outlet side linear section EX.

Figure 6:
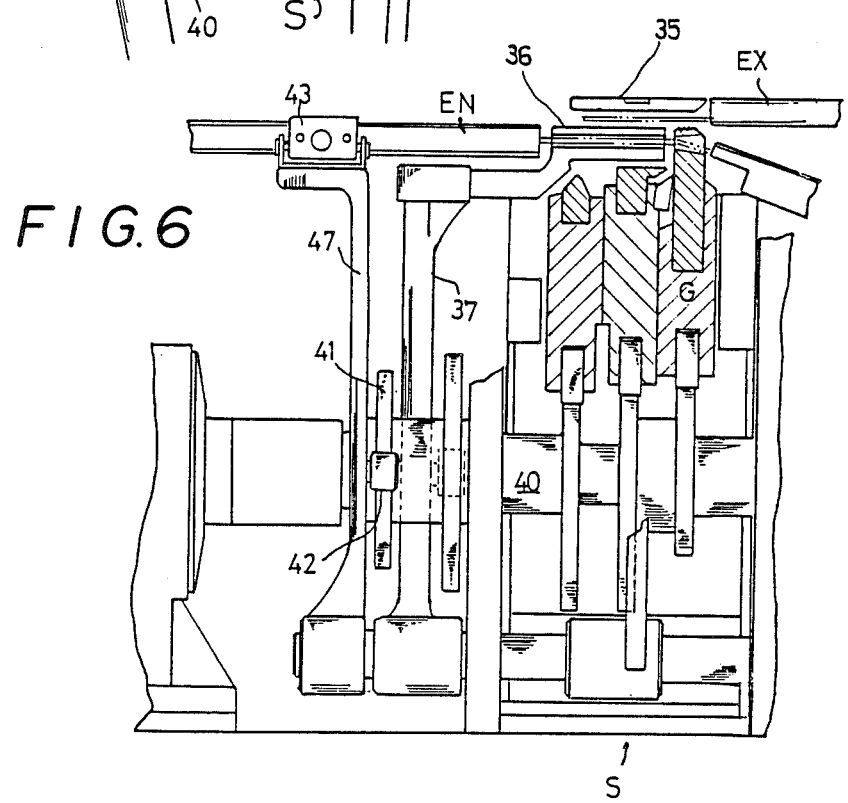
FIG. 6 is a side elevational view, partly in section, showing a mechanism for forcibly opening a section of the arch guide.

In FIGS. 1 and 3, reference numerals 33 and 34 indicate feed rollers for feeding the band to the arch guide 20 or for retracting the band to withdraw the band from the arch guide 20. In FIG. 6, numeral 35 denotes a slide table, 36 is a band guide, and 37 is a band guide arm to be operated by the cam on the cam shaft 40.

In the embodiment described above, the band B is fed into the band passage 24 from the band guide 36 (FIG. 2) when the feed rollers 33 and 34 rotate forwardly. The band is introduced through the linear section EN which is of U-shaped cross-section. The band travels to the first corner section W and successively through the second, third and fourth corner sections X to Z. The band eventually arrives at the lower surface of a slide table 35 on the upper surface of the band guide 36 through the U-shaped linear section EX. As described subsequently herein, the band, while being advanced, contacts the outer piece 21. Therefore, there is no risk of the band escaping through the gap between the inner piece 22 and the guide plate 16 since no such gap exists between the outer piece 21 and the guide plate. This causes the cam shaft 40 to rotate and actuate a start button, thereby causing the leading end of the band to be held by the holding mechanism G. Since the inner width of the arch guide section EX is smaller than the section EN, the portions of the band at the feeding end side and the leading end side are accurately superposed. When the leading end of the band is thus held or gripped, the band guide 36 is moved backwardly, causing the feed rollers 33 and 34 to be reversed to return the band. At this time, the band disposed in the band passage 24 starts releasing from the first corner W of the arch guide 20. In that regard, the band moves toward the open sides 23 along the inner surface 22A of the inner peripheral piece 22 of the arch guide 20 as shown in FIG. 4A and moves the arch guide away from the guide plate 16. The band exits past the open side edge of the inner peripheral piece 22. Since the inner peripheral pieces 22 of the corners W to Z of the arch guide 20 are inclined inwardly, the band can be released from the arch guide 20 extremely smoothly, and the band does not inhibit its own release.

When the band B has been completely separated from the arch guide, the arch guide 20 is successively returned toward the guide plate 16 by its own weight (and/or springs).

The band wound on the article to be strapped is thus tightened, held, cut and fusion-bonded. Then, the slide table 35 is moved backward to remove the article to be strapped, the slide table 35 is returned to the state of FIG. 6, and the band is again fed into the arch guide 20 for the next strapping operation.

When means depicted in FIG. 6 is employed for forcibly opening the linear section EN near the corner sections W or Z, the band leading end holding mechanism G is operated by the cam shaft 40 which starts rotating before the feed rollers are reversed. Rotation of the shaft 40 causes the cam 41 formed on the cam shaft 40 to slide the slide member 47 after the leading end of the band is held or gripped, whereby the linear section EN is moved perpendicularly of the paper in FIGS. 1, 3 and 6. The arch guide 20 is returned to its original position after the band has been reversed by the feed rollers (which rollers are regulated by a timer according to the usual arch size).

As described above, during band withdrawal the band is progressively moved along the oblique surface 22A toward the guide plate to be reliably and smoothly pulled from the corner and linear sections. Since the removal of the band is controlled by the inner peripheral piece 22 of the corner, the width of the arch guide can be large. Therefore, even if the band is meandered, the meandering movement is absorbed to smoothly feed the band in the arch guide without inhibiting the band from exiting from the passage 24.

Figure 7:
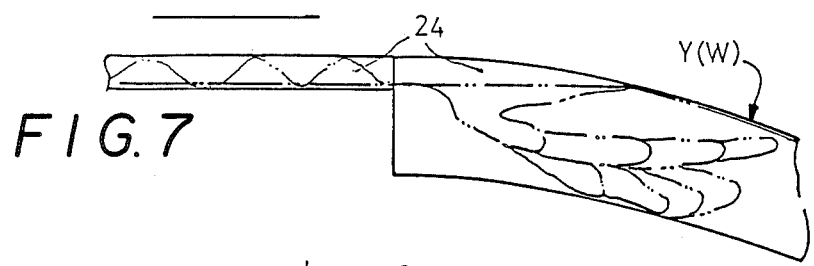
FIG. 7 is a schematic view of a junction between linear and cover sections of the arch depicted in FIG. 1 showing a problem which could occur in the absence of a guide feature of the present invention.
Figure 8:
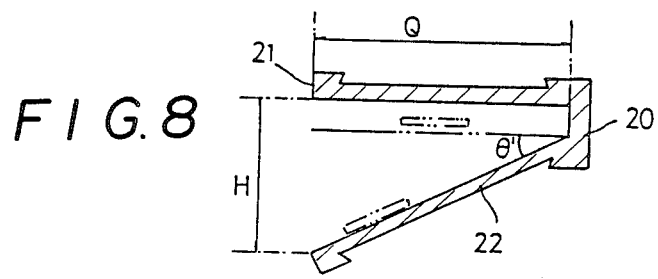
FIG. 8 is a sectional view of a section of the arch which includes a guide for solving the problem depicted in FIG. 7.

The corners, which are connected to the linear sections of an arch guide, are manufactured by folding a U-shaped arch guide at a predetermined angle so that the angle is gradually increased in the band feeding direction to align the band feeding inlet end of the corner with the band passage of the linear section. As the band is fed, it is urged against the outer peripheral piece by centrifugal force. As the band travels along the linear sections, it assumes an undulating posture, as shown at the left-hand end of FIG. 7. However, since the inner peripheral piece 22 of each corner forms an acute angle to the guide plate, the space between the inner and outer pieces 22, 21 is larger in the corner sections than in the linear sections. That is, at the corners, the band is afforded a greater degree of freedom and is not constrained to follow an undulating path. Thus, as it is fed through the corners the band cam fluctuate inwardly and outwardly.

Heretofore, such fluctuation could present a problem in cases where an inexpensive band having weak stiffness is fed, because when such a band collides with the outer peripheral piece of the corner, the band is folded in such manner that the leading end of the band collides with the trailing band portion, and is overridden thereby (see FIG. 7) so as to cause a jam-up.

There will now be described an embodiment of the invention which eliminates this malfunction and is described with reference to FIGS. 9 and 10A–10H.

Figure 9:
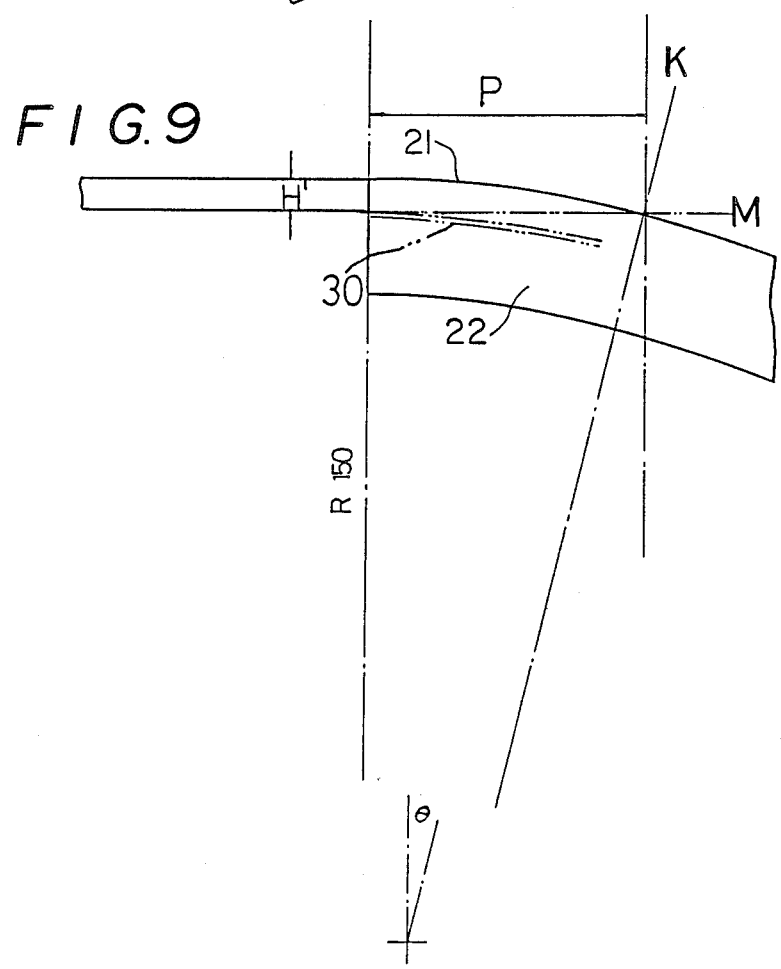
FIG. 9 is a schematic view of a corner of the arch wherein a guide is formed to facilitate the handling of very flexible bands.

A guide 30 (FIG. 9) is formed at the inlet end of the corner (and possibly also at the outlet end of the corner) and extends in the band feeding direction. The guide 30 may be formed at each of the corners, or only at first corner W. More particularly, the guide 30 is positioned at the end of the inclined inner peripheral piece 22 and extends into the inlet of the corner in the band feeding or advancing direction as shown in FIG. 9. A band-accommodating gap as large as the thickness of the band is defined between the inner wall 21A of the outer peripheral piece 21 and the guide. An imaginary extension M of the inner peripheral piece 22 of the linear section of the guide arch intersects the outer piece 21 of the corner. If a radial line K is drawn to that intersection, the line K (from the center of curvature of the corner section) will form an angle 8 with another radial line R which intersects the junction of the linear and corner portions of the arch guide. The guide 30 stops short of the line K. The length P may, in some cases, be 12% of the length of the corner. The guide 30 enables even weak bands to be fed through the corners.

Figure 10:
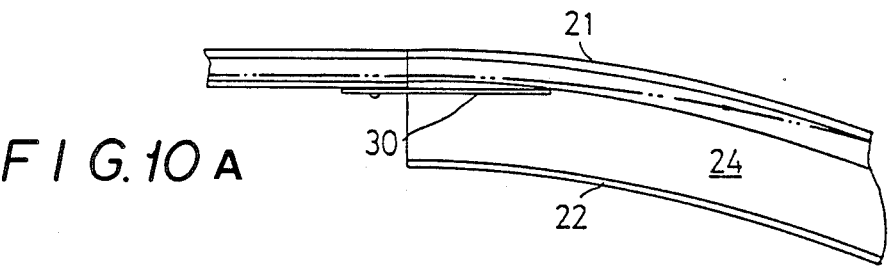
FIGS. 10A through 10D are side views showing, respectively, embodiments of the guide feature of the invention.
FIG. 10E is a perspective view of the embodiment of FIG. 10D.
FIGS. 10F, 10G, 10H are sectional views taken along the lines 10F—10F, 10G—10G, 10H—10H of FIG. 10D.
Figure 10:
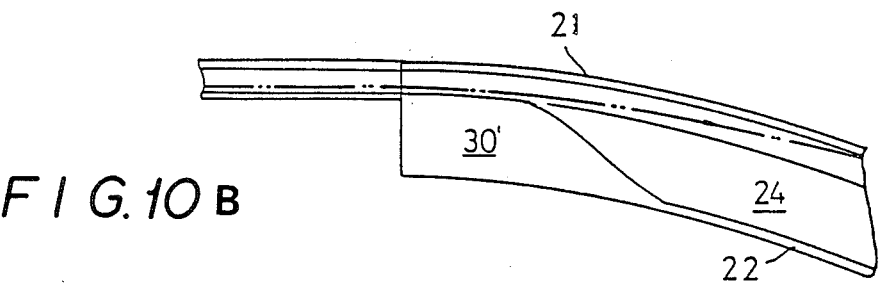
Figure 10:
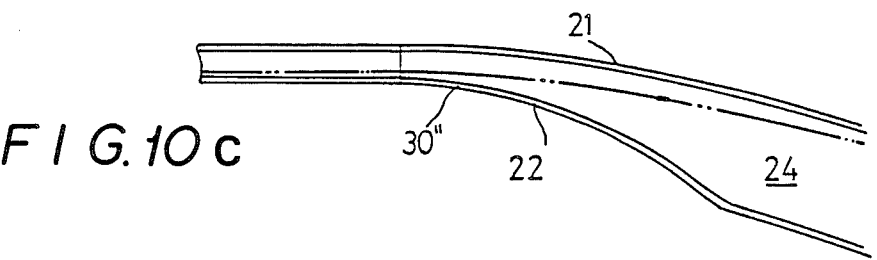
Figure 10:
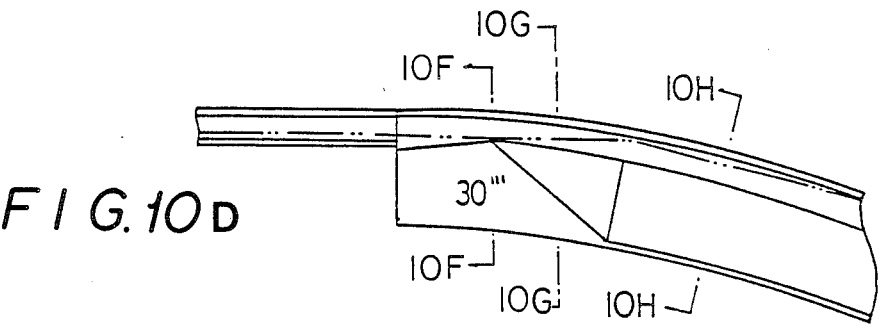

FIGS. 10A to 10H show different configurations of the guide 30, wherein FIG. 10A illustrates a metal guide piece 30 having a width substantially similar to that of the band passage and fastened at the rear end thereof to the outer end of the inner peripheral piece 22 so as to extend into the corner. FIG. 10C illustrates how the inner peripheral piece 22 can be gradually deformed to form a guide 30″. FIG. 10B illustrates how a guide 30′ can be formed by cutting the corner, thereby creating a guide having an oblique angle which further facilitates the removal of the band. FIGS. 10D to 10H illustrate still another embodiment in which the inner piece 22 has an upper surface which forms a guide 30‴ extending toward the outer peripheral piece 21. According to the embodiments described above, even if a relatively hard and thick band is undulated at the corner, the band can be reliably prevented from locking.

Figure 4B:
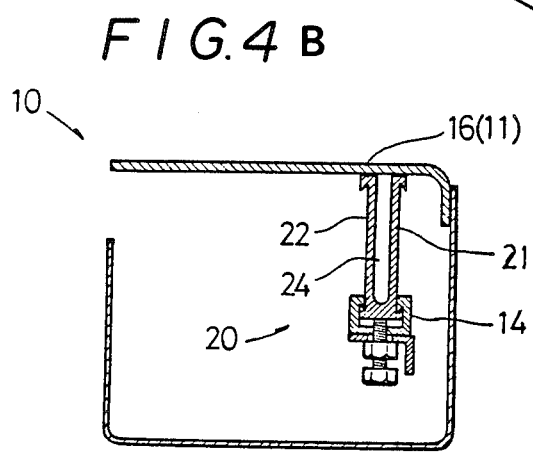
Figure 4C:
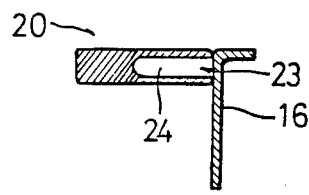

The linear portions of the arch guide are molded in one piece of metal or synthetic resin, with the outer and inner peripheral pieces 21 and 22 arranged in parallel with one another (see FIG. 4B).

The band passage 24 at the corners and the linear portions may have, for example, a width of about 25 mm so as to be roughly 1.5 to 6 times as large as a customary band width (e.g., 4.5 to 19 mm). The linear portions may have a height H′ of 3 mm for example, which is less than the band width. The height H at the corners would be larger, since the inner peripheral piece 22 is inclined at angle $\theta'$ which may be, for example 25°. A typical height H at the corner could be 14.66 mm.

When the band guiding arch of this invention is of predetermined arch size, it is not necessary to individually form and couple the corners and the linear sections of the arch guide 20 as described above, but instead the entire arch guide can be molded of one piece.

Referring to FIGS. 11 to 14, further embodiments of the invention guide arch 10A will be described. Linear sections of the arch guide 20A are each formed to have, as shown in FIG. 13B, for example, outer and inner peripheral pieces 21A and 22A formed of metal pieces of the same width and length, a frame 136 of rod shape, for example, made of metal, and an open side 23 formed in series with open sides 23 of the corner sections as described above.

More specifically, the linear sections of the arch guide 20A, except the band inlet side linear section EN, in the embodiment shown in FIGS. 11 to 14, have a flap 130. The flap 130 has a flap piece 132 made of a linear plate, and a hinge pin 131 rotatably coupling a rear end of a stationary L-shaped piece 133 with the flap piece 132. The flap piece 132 and the stationary piece 133 are fastened, for example, by spot welding to the outer and inner peripheral pieces 21A and 22A which form the arch guide 20A. An adjusting bolt 134 is movably inserted into holes formed in the pieces 132, 133 and the frame 136 is secured by a nut 137. A spring 135 is interposed between the head of the adjusting bolt 134 and the flap piece 132. Therefore, the inner peripheral piece 22A of the linear section of the arch guide 20A is fastened by the adjusting bolt 134 and the nut 137 to the frame 136. The outer peripheral piece 21A is rotatable for widening the opening 23 against the tension of the spring 135. Normally, the frame 136 retains the pieces 21A, 22A in parallel to define a constant gap which forms said open side 23. The flap 130A may, as shown in FIG. 14A, be formed to have the flap piece define a leaf spring 138. The leaf spring 138 and the stationary piece 133 may be clamped to the frame 136 to urge the outer peripheral piece 21A toward the inner peripheral piece 22A, thereby normally maintaining the open side of the arch guide 20A in U-shape. In this case, it is not necessary to form the flap 130A in a hinged configuration, and the adjusting bolt 134 is not required.

As shown in FIG. 14B, the stationary piece 133 of the flap 130B may be clamped to the frame 136, and a magnet 139 may be buried in the surface of the frame 136 opposed to the flap piece 132. The flap piece 132 may be urged by the magnetic force of the magnet 139 toward the center of curvature of the arch.

As shown in FIG. 14C, the rear ends of the flap piece 132 and the stationary piece 133 of the flap 130C may be connected by a spring 148, and the flap piece 132 may be urged by the spring 148 in the central direction of the arch, thereby maintaining the U-shaped open side. In this case, the adjusting bolt 134 is unnecessary, and it is not necessary to form the flap in a hinged shape.

The height of the frame 136 is formed higher than the distance between the outer peripheral piece and the inner peripheral piece to readily form the hinge, and to increase the strength of the entire arch guide. In any case, other shapes may be employed as long as the outer peripheral piece 21A can be displaced relative to and in a direction opposite to the inner piece 22A.

Figure 11:
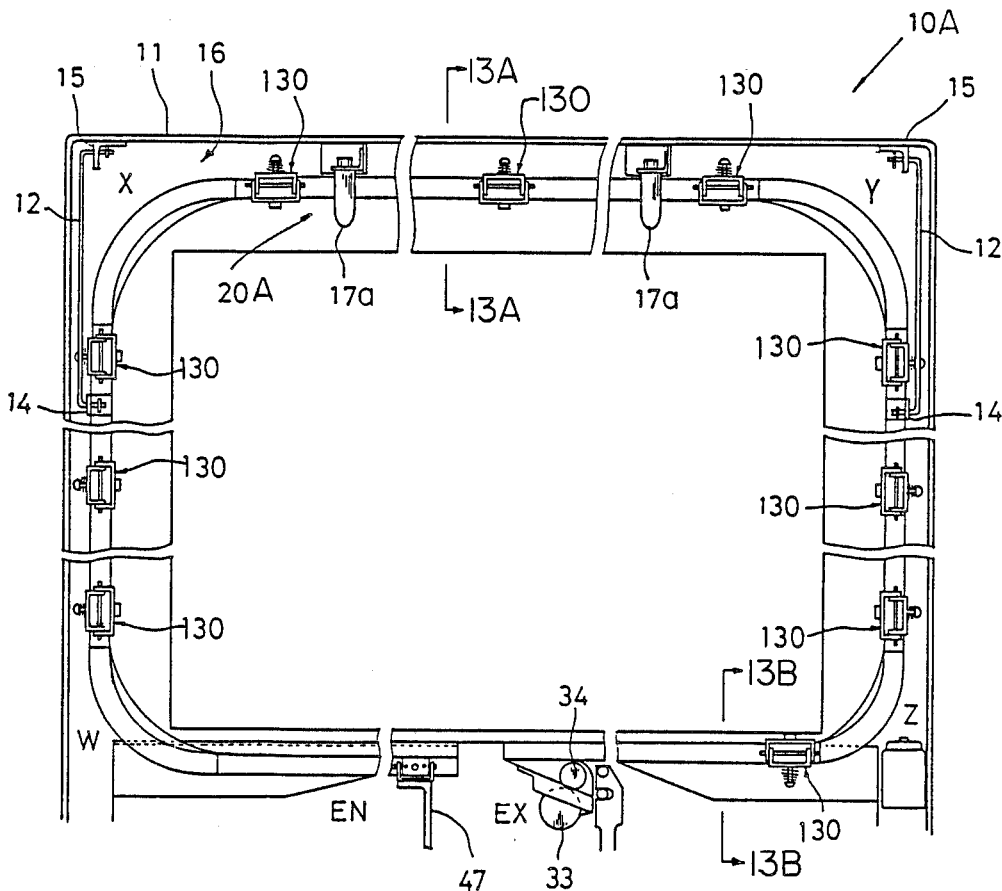
FIG. 11 is a side elevational schematic view of an arch embodying further aspects of the invention.
Figure 13:
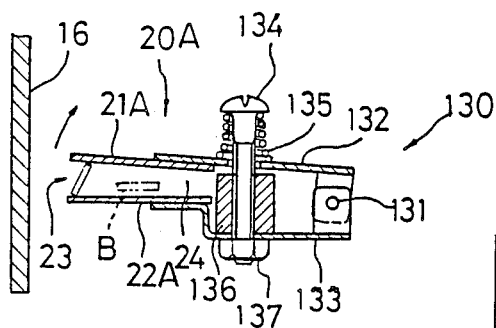
FIGS. 13A and 13B are sectional views along the line 13A—13A in FIG. 11, showing different positions of the band.
FIG. 13C is a sectional view taken along the line 13B—13B in FIG. 11.
Figure 14:
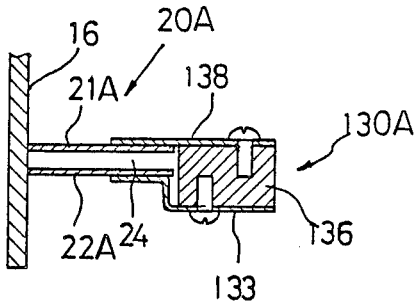
FIGS. 14A to 14C are sectional views showing additional embodiments of linear sections.
Figure 13:
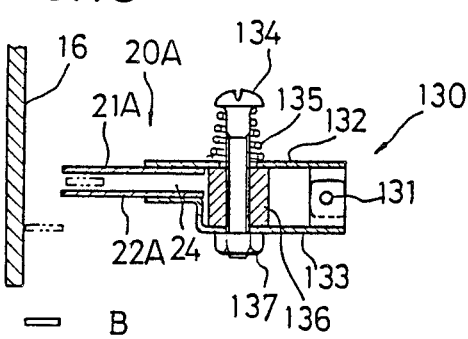
Figure 14:
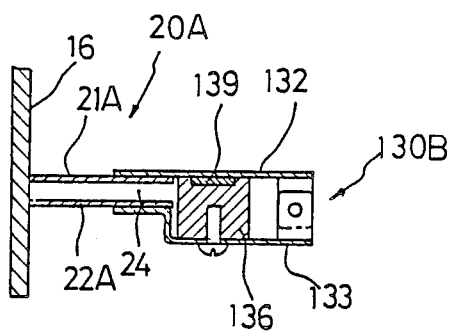
Figure 13:
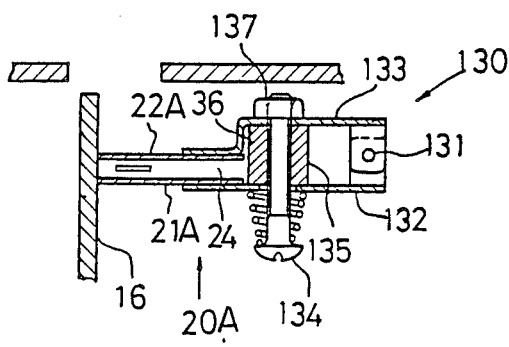
Figure 14:
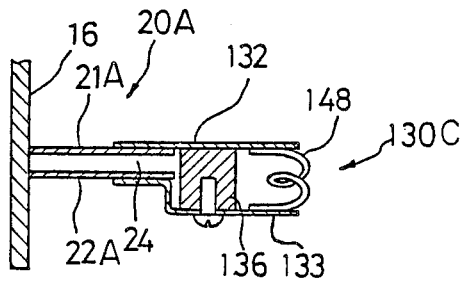

In FIG. 11, two stops 17a are mounted by brackets on the guide plate 16. The stops 17a are positioned between the flaps 130 of the linear portions of the upper side of the arch guide 20A. The stops are spaced from the arch guide by a gap which is smaller than the band width. Thus, when the upper side linear section of the arch guide 20 moves horizontally away from the guide plate 16 when the band is being withdrawn, the frame 136 contacts the stops 17a to limit the movement of the arch guide 20 to a distance slightly shorter than the band width.

Therefore, when the feed rollers 33 and 34 are simultaneously reversed to withdraw the band, the band disposed in the band passage 24 first moves toward the opening 23 along the inner surface of the inner peripheral piece 22 at the first corner W of the arch guide 20 to successively press the arch guide 20 away from the guide plate 16 and pass between the open edge of the inner peripheral piece 22A and the surface of the guide plate 16. A similar action then occurs sequentially at the linear section above the first corner W, the second corner X, the upper side linear section, the third corner Y, the linear section below the third corner Y and the fourth corner Z.

At this time, the band which tends to move away from the arch guide 20A might move toward the open side 23 in a slightly twisted state, but the outer peripheral piece 21A is rotated against the spring 135 in a direction for widening the opening 23 by the action of the band being turned within the passage 24 (FIG. 13A).

Figure 15:
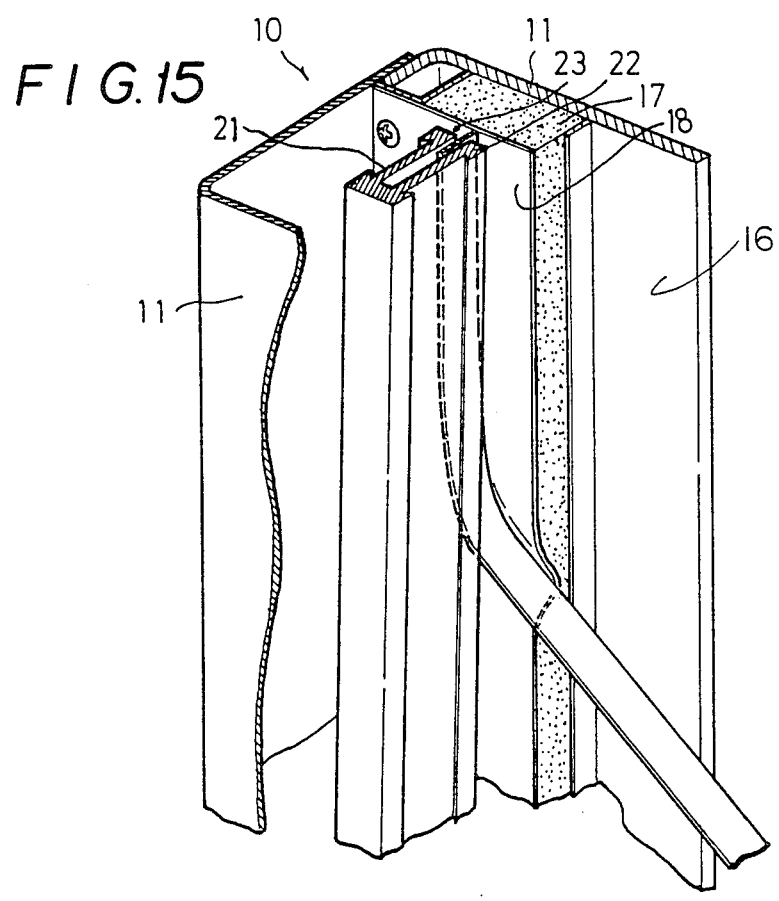
FIG. 15 is a fragmentary perspective view of a linear section of the arch guide illustrating a band being
Figure 16:
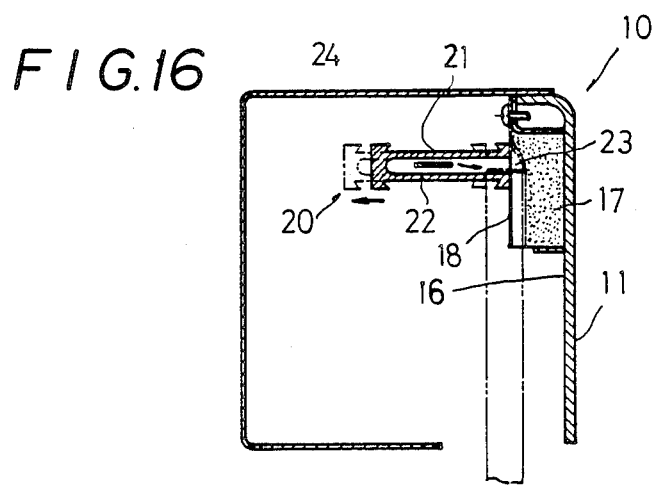
FIG. 16 is a cross-sectional view taken along the line 16I—16I in FIG. 3.

Another embodiment of a band guiding arch of the invention will be described with reference to FIGS. 15 to 17.

Mounted on the guide plate 16 is an elastic member 17, and mounted on the elastic member is a sheet 18 made of a wear-resistant material having a small frictional coefficient such as Teflon ® or a super high polymer polyethylene. The elastic member 17 may be made of foamable urethane, foamable sponge, continuously foamable sponge, for example, or cotton. Alternatively, the elastic member could comprise an elastic vessel filled with fluid, such as an air cushion or a rubber balloon. The guide plate 16 preferably comprises the only surface to contact the arch guide 20.

As noted earlier, when the feed rollers 33 and 34 normally rotate to feed the band through the band passage 24, the band travels with an undulating or meandering movement, especially in the case of a slender band having reduced thickness and weak stiffness or a relatively inexpensive band. Thus, the band collides with all surfaces surrounding the passage 24 whereby movement of the band is resisted. However, since the sheet 18 has a frictional coefficient, and the elastic member 17 produces a local elasticity, the undulation and meandering movement of the band is not excessively resisted thereby.

Further, when the band is withdrawn from the guide arch, the noise and vibration associated with band withdrawal, is damped by the sheet 18 and elastic member 17.

Figure 17:
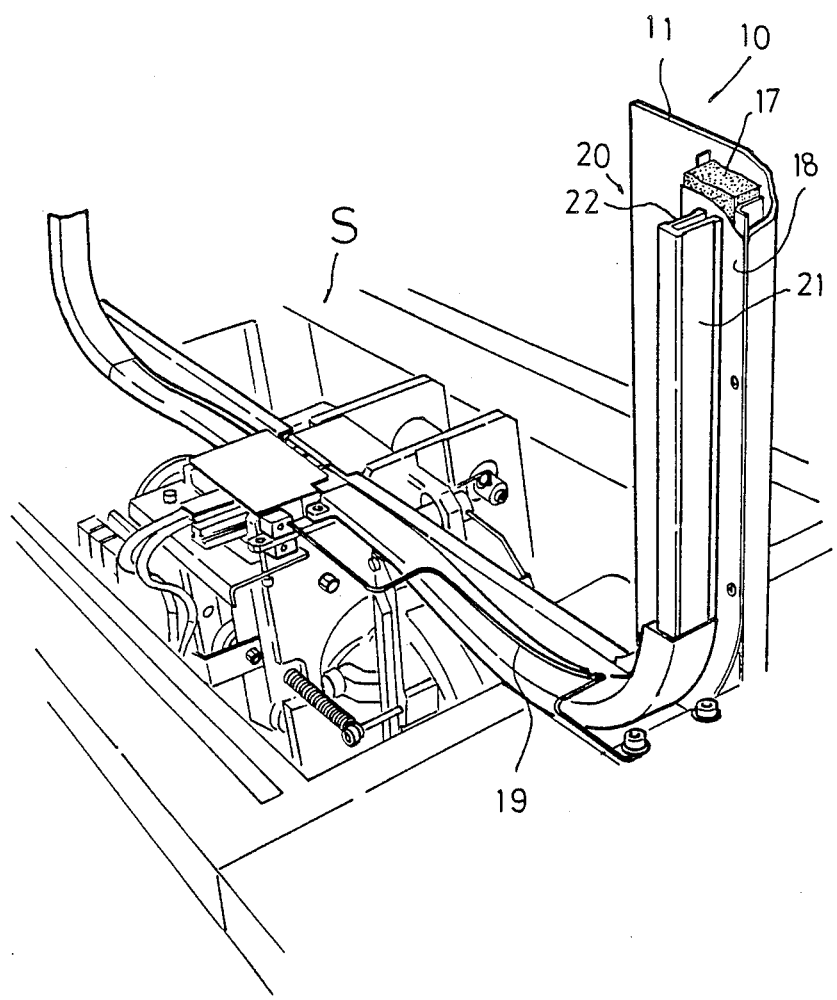
FIG. 17 is a perspective view of a lower corner section of an arch depicting another feature of the invention.
Figure 18:
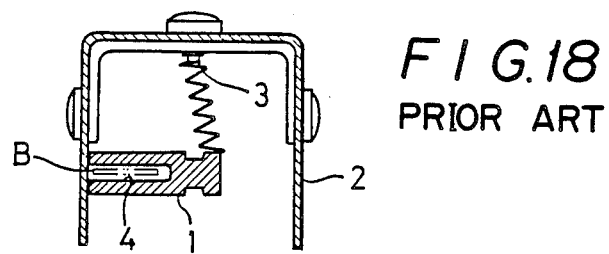
Figure 19:
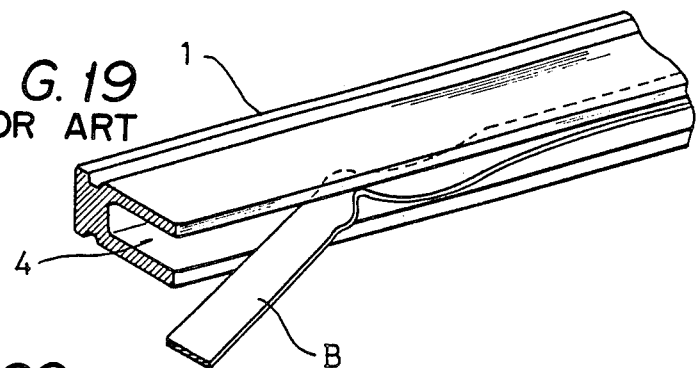
Figure 20A:
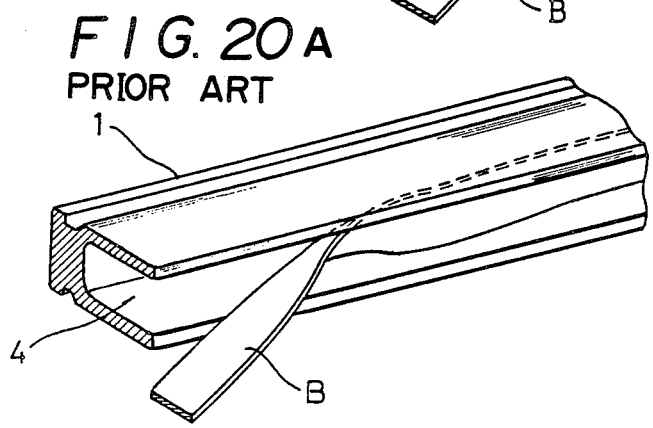
Figure 20B:
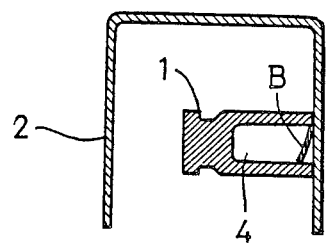

To supplement the vibration damping of the members 17, 18, a band vibration prevention bar 19 may be provided (see FIG. 17). That bar 19 possesses a certain elasticity and is positioned adjacent the fusion-bonding mechanism S.

What is claimed is:

1. A band guiding arch for a strapping machine, comprising a guide plate and an arch guide having corner sections interconnected by linear sections, said corner and linear sections including inner and outer peripheral portions disposed, respectively, closer to and farther from a center of said arch guide, said inner and outer peripheral portions forming therebetween a band passage for containing a band to be wrapped around an article to be strapped, said passage being open at a side thereof facing said guide plate, said arch guide being urged toward said guide plate in a yieldable manner to close said open side while permitting said arch guide to be moved away from said guide plate under the urgings of said band when the direction of travel of said band has been reversed, whereby said band may be withdrawn from said passage, said inner peripheral portions of said corner sections including band-engaging surfaces extending toward said guide plate at an inwardly directed inclination relative thereto such that said band-engaging surface forms an acute angle with said guide plate to facilitate movement of said arch guide away from said guide plate as said band is being withdrawn from said passage.

2. A band guiding arch according to claim 1, wherein said outer peripheral portion forms a ninety degree angle with said guide plate.

3. A band guiding arch according to claim 1 including a band guide projecting from a linear section into an adjacent corner section between said inner and outer peripheral portions thereof for guiding an advancing band toward said last-named peripheral portion.

4. A band guiding arch according to claim 6, wherein said outer peripheral portion of said linear sections is yieldably biased toward said inner peripheral portion to be able to be displaced away from said inner portion for increasing the height of the open side.

5. A band guiding arch according to claim 4, wherein said guide plate carries a wear-resistant, anti-friction sheet toward which said open side of said arch guide is yieldably urged.

6. A band guiding arch according to claim 5, wherein an elastic member is interposed between said sheet and said guide plate.

7. A band guiding arch according to claim 1, wherein said guide plate carries a wear-resistant, anti-friction sheet toward which said open side of said arch guide is yieldably urged.

8. A band guiding arch according to claim 10, wherein an elastic member is interposed between said sheet and said guide plate.

* * * * *